United States Patent [19]

Gentles

[11] Patent Number: 4,959,992
[45] Date of Patent: Oct. 2, 1990

[54] PIEZO-ELECTRIC TRANSDUCER TEST APPARATUS

[75] Inventor: Robert Gentles, Linlithgow, Scotland

[73] Assignee: The Marconi Company Limited, England

[21] Appl. No.: 338,952

[22] Filed: Apr. 17, 1989

[30] Foreign Application Priority Data

Apr. 25, 1988 [GB] United Kingdom ............... 8809687

[51] Int. Cl.⁵ ............................................. H01L 41/42
[52] U.S. Cl. ...................................... 73/10 V; 367/13
[58] Field of Search ................. 73/1 DV, 865.6, 865.8, 73/865.9; 367/13

[56] References Cited

U.S. PATENT DOCUMENTS

| | | | |
|---|---|---|---|
| 4,331,021 | 5/1982 | Lopez et al. | 73/1 DV |
| 4,475,376 | 10/1984 | Keilman | 367/13 |
| 4,747,295 | 5/1988 | Feist et al. | 73/1 DV |
| 4,838,070 | 6/1989 | Bradley | 73/1 DV |

FOREIGN PATENT DOCUMENTS

| | | | |
|---|---|---|---|
| 2318406 | 2/1977 | France | 73/1 DV |
| 1027598 | 7/1983 | U.S.S.R. | 73/1 DV |

*Primary Examiner*—Robert Raevis
*Attorney, Agent, or Firm*—Kirschstein, Ottinger, Israel & Schiffmiller

[57] ABSTRACT

An acoustic loading rod for use in testing transducers which are intended for use in a liquid medium. The rod comprises an elongated body (10) capable of simulating the normal acoustic impedance presented to a transducer to be tested by the medium in which the transducer is to operate, the rod (10) having a bore (30) in its main body portion containing a core of material having a close match of acoustic impedance with the material of the rod but a higher acoustic loss factor. Active piezo-electric transducer (22) is mounted between the ends of the rod.

6 Claims, 1 Drawing Sheet

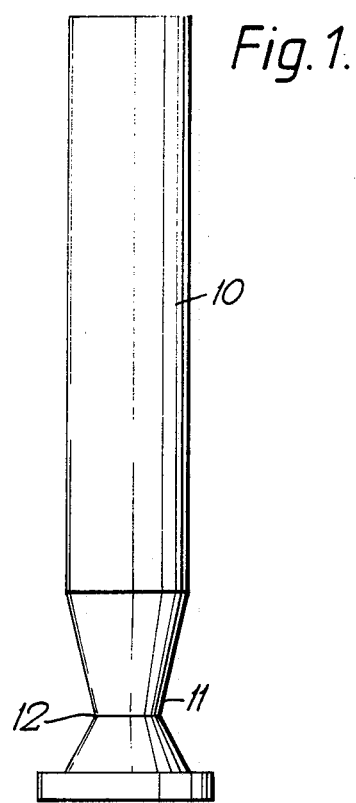
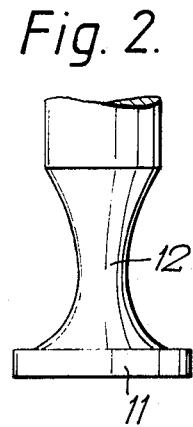
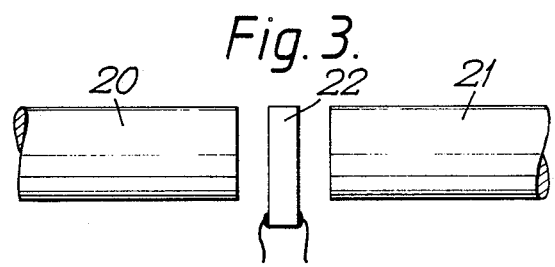
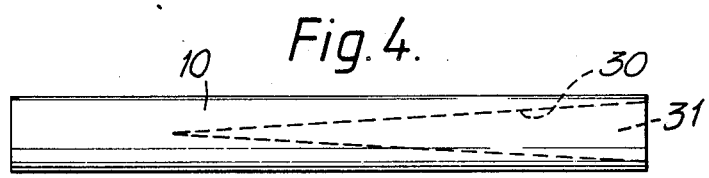
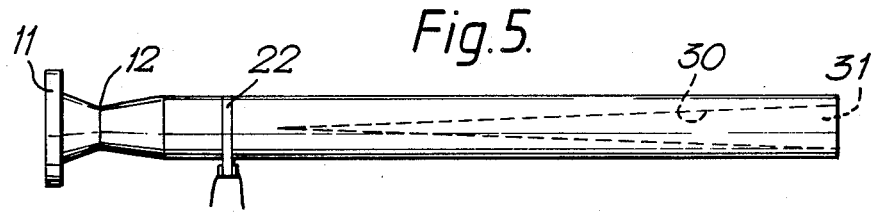

PIEZO-ELECTRIC TRANSDUCER TEST APPARATUS

BACKGROUND OF THE INVENTION

1. Field of the Invention

The present invention concerns the testing of piezo-electric transducers.

2. Description of Related Art

One application involving the use of piezo-electric transducers is in generating or detecting acoustic signals under water. In order to test such transducers it is necessary to simulate the normal acoustic impedance presented to them in the medium in which they are intended to operate. This presents problems when the operating medium is a fluid such as water.

SUMMARY OF THE INVENTION

The present invention is concerned with providing apparatus for testing piezo-electric transducers intended for operation in a liquid medium without the need for immersing the transducers in the liquid medium.

Accordingly one aspect the present invention consists in a loading rod for use in testing transducers. The rod comprises an elongated body capable of simulating the normal acoustic impedance presented to a transducer to be tested by the medium in which the transducer is to operate. The rod has a bore in its main body portion containing a core of material having a close match of acoustic impedance with the material of the rod but a higher acoustic loss factor.

BRIEF DESCRIPTION OF THE DRAWINGS

In order that the present invention may be more readily understood various embodiments thereof will now be described by way of example and with reference to the accompanying drawings, in which FIG. 1 is a side view of one embodiment of a transducer test apparatus incorporating an acoustic waveguide and according to the present invention, FIG. 2 is a view of one end of a second embodiment of transducer test apparatus, FIG. 3 shows how a compression wave can be monitored in an acoustic waveguide forming part of apparatus according to the present invention, FIG. 4 shows a further modification of the waveguide shown in FIG. 1, and FIG. 5 shows an acoustic waveguide according to the present invention and incorporating all the features shown in FIGS. 1, 3 and 4.

DETAILED DESCRIPTION OF THE PREFERRED EMBODIMENTS

Referring now to FIG. 1 of the accompanying drawings this shows an acoustic waveguide in the form of a rod-like member 10 made from a rigid, low-loss material such as an acrylic polymer. One suitable material is Perspex (RTM). The purpose of the rod 10 is to present a mechanical impedance to a piezo-electric transducer which corresponds to the complex load, normally referred to as $Z_L$, which the transducer sees when immersed in water. The load represented by the rod is equivalent to a mass in series with a radiation resistance both of which vary with frequency. In use the test transducer end 11 of the rod 10 is placed in contact with the emitting head of the transducer being tested. The contact can be improved by the use of a couplant in the form of a suitably viscous fluid to exclude air bubbles.

As can be seen from FIG. 1, the transducer end 11 of the waveguide rod 10 has a waisted portion indicated at 12. This waisted portion is made of a pair of opposed frusto-conical sections. FIG. 2 of the drawings shows the transducer end 11 of a second embodiment of acoustic waveguide according to the present invention.

The two shapes shown in FIGS. 1 and 2 of the transducer ends increase the frequency range over which a water load can be simulated by a single acoustic waveguide. The shapes are obtained by using an iterative procedure using a computer program. The program calculates the response of given shapes when acoustic loads have been imparted to them and compares these responses graphically to a set of theoretical water load impedances. Using a combination of transmission line theory and pragmatic experience a skilled operator can modify the shapes to obtain better matches. It will be appreciated that different frequency ranges and transducer diameters will provide different requirements on the final profiles.

Referring now to FIG. 3 of the drawings a central part of an acoustic rod basically similar to that shown in FIG. 1 or 2 is shown. However in this embodiment the main body of the rod 10 has been separated into two portions 20, 21 and a transducer 22 placed between the two portions. In its operational state the two portions of the rod would be bonded to either side of transducer 22. The transducer 22 is capable of monitoring the amplitude and phase of the signals output by a transducer under test. The transducer 22 can also be used bi-directionally to inject a signal into the rod to simulate an external source of acoustic energy and thus test the receiving abilities of any transducer under test.

The transducer 22 is made from a piezo-electric polymer. One suitable material is marketed under the name "KAYNAR" (RTM) by the PENWALT CORPORATION. Other comparable materials such as PVDF or PVF2 are equally suitable (Poly Vinyleiden Fluoride). Referring now to FIG. 4 of the drawings a section through the main body portion of an acoustic waveguide according to the present invention is shown. As can be seen in this figure the main body of the rod-like acoustic waveguide 10 is provided with an internal tapered bore 30 with the taper extending towards the transducer end 11 of the rod. The bore 30 is filled with a core of material which has a close match of acoustic impedance to the material of rod 10 but has a very high acoustic loss factor. In the embodiment being described the core material is a metal loaded epoxy that is only partially polymerized. A suitable care material is LOCTITE METAL SET S2 (RTM) mixed in the ratio of 100% hardener to 40% adhesive. This ratio may change slightly in accordance with requirements. The manufacturer's recommended mix for full polymerization is 100% hardener to 100% adhesive + or − 10%.

Alternative materials may include soft plastics mixed with some high density loading material.

The body of rod 10 provides the main acoustic load and the provision of the tapered bore 30 and its core is intended to optimize the energy absorbing performance of the acoustic load. The exact nature of the taper in the bore is not critical but at some point within rod 10 the core material 31 must appear to occupy the cross-sectional area of the body.

FIG. 5 of the drawings shows a single acoustic waveguide incorporating all of the features previously described. Thus the acoustic waveguide 10 has a transducer end 11 which is waisted at 12 so as to produce the required frequency response characteristics. The rod also includes another a transducer 22 of the kind described with regard to FIG. 3, and includes a tapered bore 30 housing a core 31 of very high acoustic loss factor material as in the embodiment described with regard to FIG. 4. The rod can be mounted in a test rig with similar rods so that an array of transducers can be tested simultaneously.

Whilst the preceding description has been directed to piezo-electric transducers, it will be appreciated that the invention can be applied to any type of transducer in which an acoustic wave is generated for transmission through a medium of interest. An example of another type of transducer is the magnetostrictive transducer.

I claim:

1. An acoustic loading rod for use in testing transducers which normally operate in a liquid medium, the loading rod comprising: an elongated body having opposite ends and a rod material capable of simulating the normal acoustic impedance presented to a transducer to be tested by the medium in which the transducer is to operate, the body having an internal tapered bore containing a core of material having a close match of acoustic impedance with the rod material but a higher acoustic los factor than the rod material, said core material being a metal loaded, partially polymerized epoxy, and a piezo-electric transducer means mounted between the ends of the body.

2. A loading rod as claimed in claim 1 wherein the transducer means is made from a piezo-electric polymer and the body of said rod is separated into two portions bonded to either side of said transducer means.

3. An acoustic loading rod for use in testing transducers which normally operate in a liquid medium, the loading rod comprising:

(a) an elongated body having a test transducer end adapted to be placed in contact with the emitting portion of a transducer to be tested, and an opposite end, said body being formed of a rod material;

(b) a tapered bore formed within said body;

(c) a core of material housed within said bore, the core material having a close match of acoustic impedance with respect to the rod material but a higher acoustic loss factor; and (d) a piezo-electric transducer means mounted between the ends of said rod and operative in one operational mode for injecting acoustic energy into said rod, the rod material simulating the normal acoustic impedance presented to the transducer to be tested by the liquid medium in which the transducer is to operate.

4. An acoustic loading rod for use in testing transducers which normally operate in a liquid medium, the loading rod comprising: a main body formed of a rod material that simulates the normal acoustic impedance presented to a transducer to be tested by the liquid medium in which the transducer is intended to operate, the main body being elongated and having a test transducer end for contact placement with the transducer to be tested, the test transducer end having a first tapered section converging along one direction to a waist, and a second tapered section diverging along said one direction away from the waist, the body having an internal tapered bore containing a core of material having a close match of acoustic impedance with the rod material but a higher acoustic loss factor than the rod material.

5. A loading rod as claimed in claim 4, wherein the tapered sections are frusto-conical shapes.

6. A loading rod as claimed in claim 4, and further comprising transducer means spaced from the test transducer end, and operative in one operational mode for monitoring signals output from the transducer under test, and in another operational mode for testing signals input to the transducer under test.

* * * * *